(12) United States Patent
Akiyama

(10) Patent No.: US 6,462,831 B1
(45) Date of Patent: Oct. 8, 2002

(54) IMAGE FORMING APPARATUS AND METHOD USED THEREFOR

(75) Inventor: Satoshi Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/211,038

(22) Filed: Dec. 15, 1998

Related U.S. Application Data

(62) Division of application No. 08/636,498, filed on Apr. 23, 1996, now Pat. No. 5,872,635.

(30) Foreign Application Priority Data

Apr. 27, 1995 (JP) .............................................. 7-127138

(51) Int. Cl.$^7$ .............................................. G06K 15/00
(52) U.S. Cl. ..................................... 358/1.14; 358/405
(58) Field of Search ................................ 358/1.14, 405, 358/406, 1.15

(56) References Cited

U.S. PATENT DOCUMENTS

| | | | |
|---|---|---|---|
| 4,876,606 A | 10/1989 | Banno et al. ................ 358/434 |
| 5,124,809 A | 6/1992 | Koishikawa ................. 358/400 |
| 5,214,772 A | 5/1993 | Weinberger et al. ......... 395/575 |
| 5,243,382 A | 9/1993 | Takano et al. ............... 355/207 |
| 5,434,650 A | * | 7/1995 | Nakahara ..................... 355/202 |
| 5,532,841 A | * | 7/1996 | Nakajima .................... 358/408 |
| 5,533,175 A | 7/1996 | Lung et al. .................. 395/115 |
| 5,784,663 A | * | 7/1998 | Hayashi ......................... 399/8 |
| 5,872,635 A | * | 2/1999 | Akiyama ..................... 358/296 |

FOREIGN PATENT DOCUMENTS

EP          0 602 967        6/1994

* cited by examiner

*Primary Examiner*—Jerome Grant, II
(74) *Attorney, Agent, or Firm*—Fitzpatrick, Cella, Harper & Scinto

(57) ABSTRACT

A printer has a controller unit and an engine unit, which are connected via a video interface. Upon reception of a designating command for designating a type of condition, whose condition change is to be reported, from the controller unit, the engine unit supplies a designated condition change signal to the controller unit immediately after the condition of the designated type has changed. The controller unit requests the engine unit to output detailed data associated with the status change in response to reception of the designated condition change signal.

16 Claims, 20 Drawing Sheets

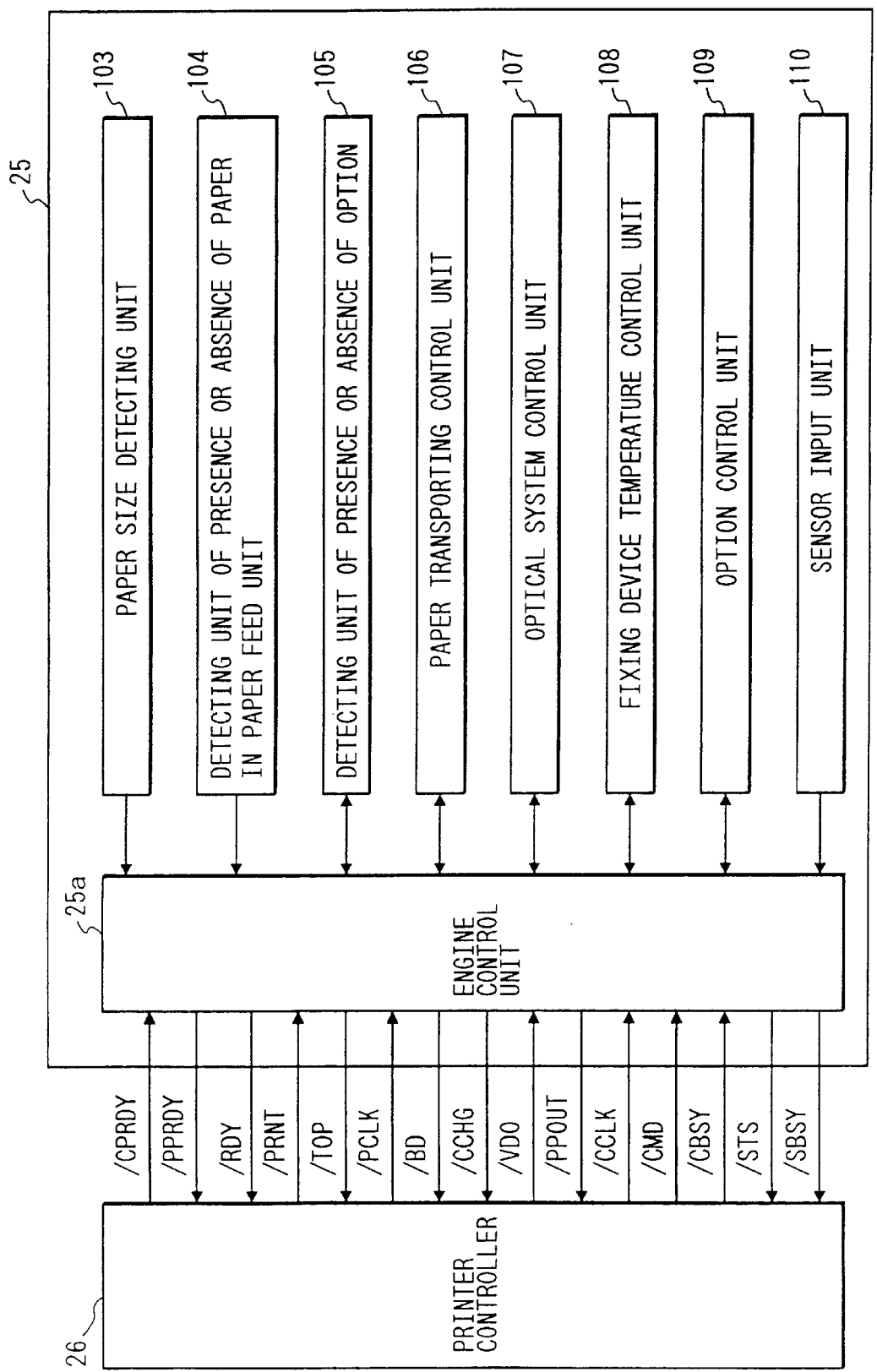

FIG. 3

| SIGNAL NAME | ABBREVIATION | CHARACTER |
|---|---|---|
| BEAM DETECTION | /BD | OUTPUT (PULSE) |
| PRINTER POWER READY | /PPRDY | OUTPUT (LEVEL) |
| READY | /RDY | OUTPUT (LEVEL) |
| TOP OF PAGE | /TOP | OUTPUT (PULSE) |
| BUSY STATUS | /SBSY | OUTPUT (LEVEL) |
| STATUS | /STS | OUTPUT (LEVEL) |
| PRINTER CLOCK | /PCLK | OUTPUT (PULSE) |
| PRINTER PAPER OUTPUT | /PPOUT | OUTPUT (PULSE) |
| BUSY COMMAND | /CBSY | INPUT (LEVEL) |
| PRINT | /PRNT | INPUT (LEVEL) |
| CONTROLLER POWER READY | /CPRDY | INPUT (LEVEL) |
| VIDEO | /VDO | INPUT (LEVEL) |
| COMMAND | /CMD | INPUT (LEVEL) |
| CONTROLLER CLOCK | /CCLK | INPUT (PULSE) |
| DESIGNATED CONDITION CHANGE | /CCHG | OUTPUT (PULSE) |

| STATUS NUMBER | CONTENTS |
|---|---|
| 0 | BASIC STATUS |
| 1 | OPERATOR CALL |
| 2 | SERVICE CALL |
| 3 | MISPRINT |
| 4 | RETRANSMISSION PAGES |
| 5 | UPPER STAGE PAPER SIZE |
| 6 | LOWER STAGE PAPER SIZE |
| ⋮ | ⋮ |
|   |   |

FIG. 5

FORMAT OF CONDITION CHANGE SUPERVISION DESIGNATING COMMAND

FIRST BYTE

| FIRST BIT (MSB) | 0 |
| --- | --- |
| SECOND BIT | 1 |
| THIRD BIT | 1 |
| FOURTH BIT | 1 |
| FIFTH BIT | 1 |
| SIXTH BIT | 1 |
| SEVENTH BIT | 1 |
| EIGHTH BIT (LSB) | 1 : ODD PARITY |

SECOND BYTE

| FIRST BIT (MSB) | 0 |
| --- | --- |
| SECOND BIT | STATUS NUMBER (BINARY SIXTH DIGIT) |
| THIRD BIT | STATUS NUMBER (BINARY FIFTH DIGIT) |
| FOURTH BIT | STATUS NUMBER (BINARY FOURTH DIGIT) |
| FIFTH BIT | STATUS NUMBER (BINARY THIRD DIGIT) |
| SIXTH BIT | STATUS NUMBER (BINARY SECOND DIGIT) |
| SEVENTH BIT | STATUS NUMBER (BINARY FIRST DIGIT) |
| EIGHTH BIT (LSB) | ODD PARITY |

FIG. 7

FORMAT OF CONDITION SUPERVISING MASK COMMAND

FIRST BYTE

| FIRST BIT (MSB) | 0 |
|---|---|
| SECOND BIT | 0 |
| THIRD BIT | 1 |
| FOURTH BIT | 1 |
| FIFTH BIT | 1 |
| SIXTH BIT | 1 |
| SEVENTH BIT | 1 |
| EIGHTH BIT (LSB) | 0: ODD PARITY |

SECOND BYTE

| FIRST BIT (MSB) | 0 |
|---|---|
| SECOND BIT | DESIGNATION OF MASK POSITION |
| THIRD BIT | DESIGNATION OF MASK POSITION |
| FOURTH BIT | DESIGNATION OF MASK POSITION |
| FIFTH BIT | DESIGNATION OF MASK POSITION |
| SIXTH BIT | DESIGNATION OF MASK POSITION |
| SEVENTH BIT | DESIGNATION OF MASK POSITION |
| EIGHTH BIT (LSB) | ODD PARITY |

FIG. 9

FORMAT OF CONDITION DESIGNATING COMMAND

FIRST BYTE

| | |
|---|---|
| FIRST BIT (MSB) | 0 |
| SECOND BIT | 1 |
| THIRD BIT | 0 |
| FOURTH BIT | 1 |
| FIFTH BIT | 1 |
| SIXTH BIT | 1 |
| SEVENTH BIT | 1 |
| EIGHTH BIT (LSB) | 0: ODD PARITY |

SECOND BYTE

| | |
|---|---|
| FIRST BIT (MSB) | 0 |
| SECOND BIT | DESIGNATION OF CONDITION |
| THIRD BIT | DESIGNATION OF CONDITION |
| FOURTH BIT | DESIGNATION OF CONDITION |
| FIFTH BIT | DESIGNATION OF CONDITION |
| SIXTH BIT | DESIGNATION OF CONDITION |
| SEVENTH BIT | DESIGNATION OF CONDITION |
| EIGHTH BIT (LSB) | ODD PARITY |

FIG. 11

| SIGNAL NAME | ABBREVIATION | CHARACTER |
|---|---|---|
| BEAM DETECTION | /BD | OUTPUT (PULSE) |
| PRINTER POWER READY | /PPRDY | OUTPUT (LEVEL) |
| READY | /RDY | OUTPUT (LEVEL) |
| TOP OF PAGE | /TOP | OUTPUT (PULSE) |
| BUSY STATUS | /SBSY | OUTPUT (LEVEL) |
| STATUS/COMMAND | /SC | INPUT AND OUTPUT (LEVEL) |
| SERIAL CLOCK | /SCLK | INPUT AND OUTPUT (PULSE) |
| PRINTER PAPER OUTPUT | /PPOUT | OUTPUT (PULSE) |
| BUSY COMMAND | /CBSY | INPUT (LEVEL) |
| PRINT | /PRNT | INPUT (LEVEL) |
| CONTROLLER POWER READY | /CPRDY | INPUT (LEVEL) |
| VIDEO | /VDO | INPUT (LEVEL) |

FIG. 12

BASIC STATUS

| FIRST BIT (MSB) | 0 |
|---|---|
| SECOND BIT | PRINT REQUEST |
| THIRD BIT | TRANSPORTING PAPER |
| FOURTH BIT | REQUEST DATA RETRANSMISSION |
| FIFTH BIT | WAITING |
| SIXTH BIT | PAUSING |
| SEVENTH BIT | CALL |
| EIGHTH BIT (LSB) | ODD PARITY |

FIG. 13

EXAMPLE OF STATUS UPON OCCURRENCE OF ERROR

| FIRST BIT (MSB) | 1 |
|---|---|
| SECOND BIT | ERROR TYPE |
| THIRD BIT | unknown |
| FOURTH BIT | unknown |
| FIFTH BIT | unknown |
| SIXTH BIT | unknown |
| SEVENTH BIT | unknown |
| EIGHTH BIT (LSB) | ODD PARITY |

(Third through seventh bits: UNKNOWN)

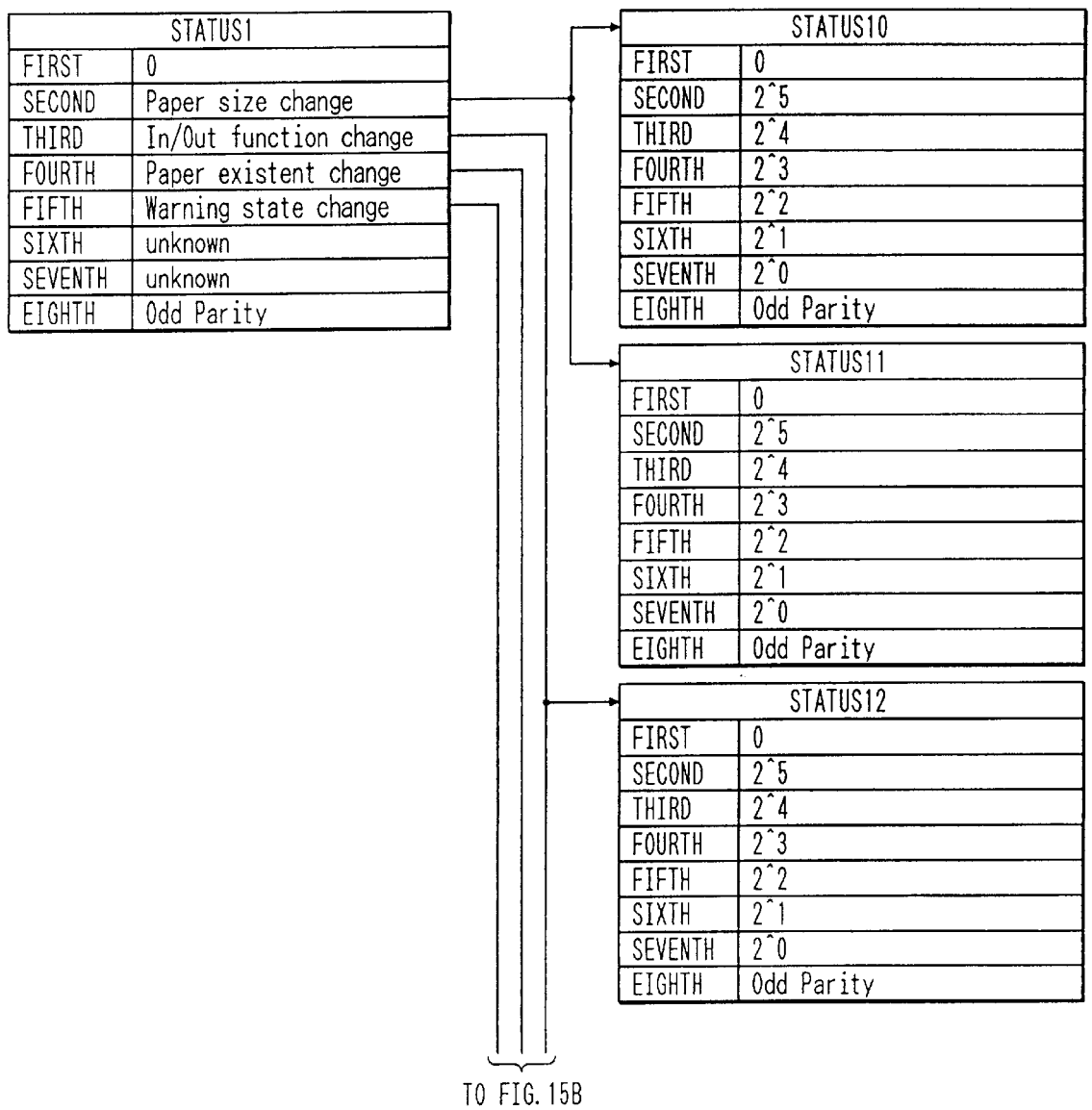

FIG. 16

SECOND BYTE (DESIGNATION OF CONDITION CHANGE STATUS)

| BIT | CONTENTS |
|---|---|
| FIRST BIT (MSB) | 0 |
| SECOND BIT | DESIGNATION OF REPORT OF PAPER SIZE CHANGE |
| THIRD BIT | DESIGNATION OF REPORT OF CONSTRUCTION CHANGE OF PAPER FEED/EJECT UNIT |
| FOURTH BIT | DESIGNATION OF REPORT OF CHANGE OF PRESENCE OR ABSENCE OF PAPER IN PAPER FEED UNIT |
| FIFTH BIT | DESIGNATION OF REPORT OF WARNING CHANGE |
| SIXTH BIT | unknown |
| SEVENTH BIT | unknown |
| EIGHTH BIT (LSB) | Odd parity |

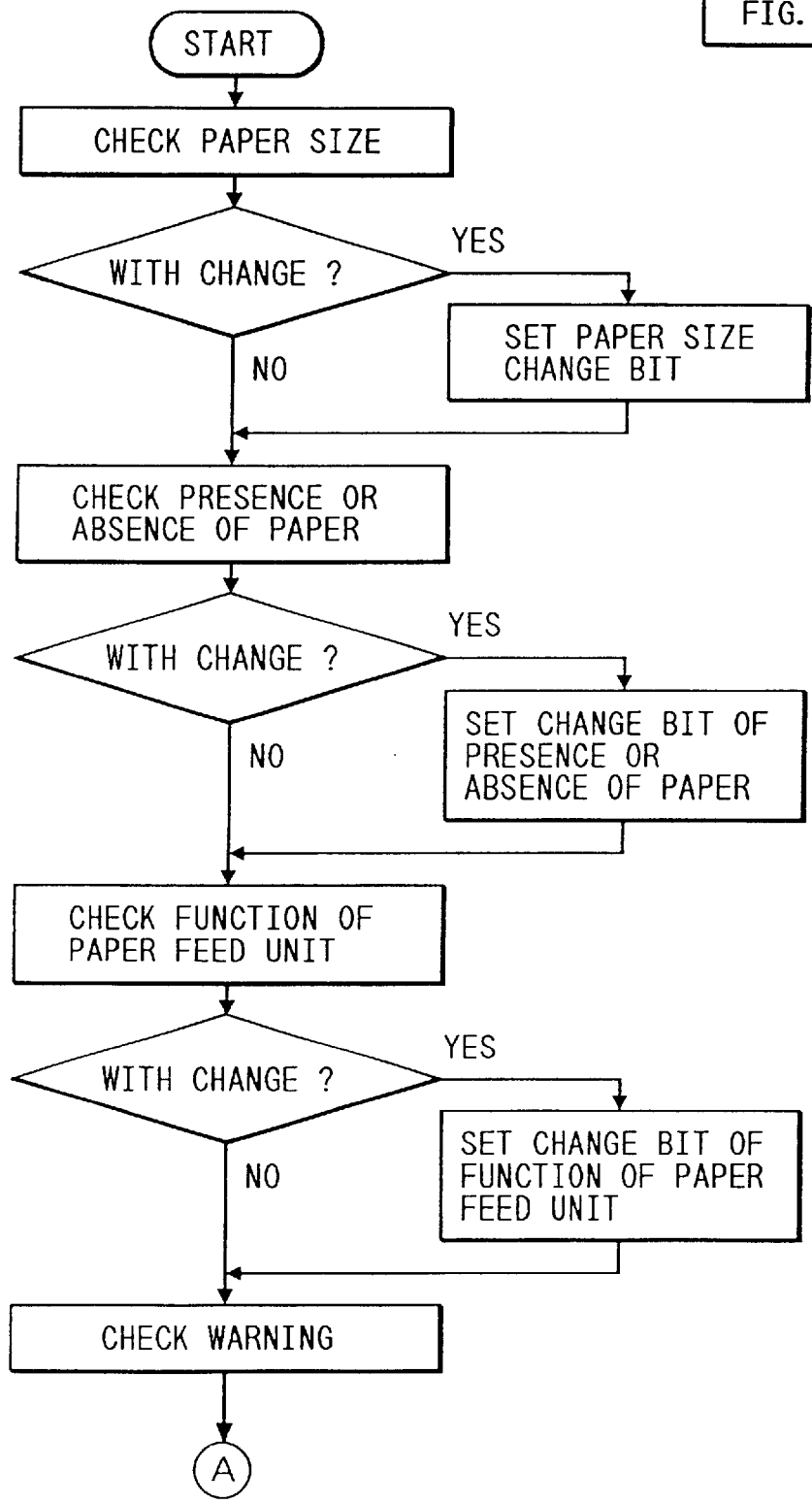

IMAGE FORMING APPARATUS AND METHOD USED THEREFOR

This application is a Division of Ser. No. 08/636,498, filed Apr. 23, 1996 now U.S. Pat. No. 5,872,635.

BACKGROUND OF THE INVENTION

1. Field of the Invention

The present invention relates to an image forming apparatus, which connects an image processing means for generating pixel data and an image forming means for forming an image on a recording medium via a communication means, and a method used therefor.

2. Related Background Art

An image forming apparatus, which is constituted by a video controller for converting code data described in a printer command system such as a page description language into pixel data, and a printer engine for forming an image on the basis of the pixel data supplied from the video controller and transferring and fixing the formed image on, e.g., a recording paper sheet, is known.

A video interface connecting the video controller and the printer engine will be described below. FIG. 11 is an explanatory view showing a list of signals of the video interface. In FIG. 11, "output" represents an output from an engine controller in the printer engine to the video controller, and "input" represents an input from the video controller to the engine controller.

A signal /BD is a horizontal synchronization signal, in the main scanning direction, of the printer engine. The video controller outputs video data /VDO for one main scanning line in synchronism with the trailing edge of the signal /BD. A signal /PPRDY indicates that a power supply is connected to the printer engine, initialization of the engine controller is completed, and it is ready to communicate command status signals between the engine controller and the video controller.

A signal /RDY indicates that the printer engine is ready to perform a print operation in response to a print start command (signal /PRNT is true). The signal /RDY changes to true under conditions that the temperature of a heating roller in a fixing unit is proper (i.e., a sufficiently high temperature for fixing a toner image on a paper sheet), a recording paper sheet has not jammed, a polygonal mirror is normally rotated at a prescribed rotational speed, the signal /BD is normally output at a prescribed period, and so on.

A signal /TOP is a print synchronization signal, in the sub-scanning direction, in the printer engine. The video controller sets the image write start position in the sub-scanning direction in synchronism with the trailing edge of the signal /TOP. The position of a paper feed sensor is determined so that the time required from when the leading end of a recording paper sheet is detected by the paper feed sensor until the recording paper sheet reaches a transfer roller equals the time required until a latent image formed on a photosensitive body by a laser beam reaches the transfer roller upon rotation of the photosensitive drum. For this reason, when the engine controller detects that a paper feed sensor signal (PFSNS) from the paper feed sensor changes to true, it immediately sets the signal /TOP to be true for one sec.

A signal /SBSY is a level signal which indicates that the printer engine is transmitting a status signal (the condition of the printer) to the video controller using a signal line /SC. At this time, as the signal /SC, serial information in units of 8 bits is transmitted to the engine controller, and this signal is called a status signal.

A signal /PPOUT notifies the video controller of the fact that a recording paper sheet on which the print operation has been completed is ejected.

A signal /CBSY is a signal which indicates that the video controller is transmitting a command (a command for the engine controller) using the signal line /SC. At this time, as the signal /SC, serial information in units of 8 bits is transmitted from the video controller to the engine controller. A signal /SCLK is a synchronization clock used upon serial transmission of the signal /SC (status and command).

A signal /PRNT is a signal with which the video controller instructs the printer engine to start the print operation. In a continuous print mode, this signal means continuation of the print operation.

A signal /CRPDY indicates that a power supply voltage is supplied to the video controller, the initialization of the video controller is completed, and the video controller is ready to communicate commands and status signals with the printer controller.

A signal /VDO is an image signal to be printed by the printer engine. This image signal is output by converting image code data received by the video controller from a host computer into dot data.

The formats of commands sent from the video controller to the engine controller and the status signals sent from the engine controller to the video controller exchanged via serial communications will be explained below.

As described above, command information and status information are 8-bit serial signals. When 1-byte command information is supplied from the video controller to the engine controller in synchronism with the signal /SCLK, the engine controller sends back 1-byte status information to the video controller. This command information includes two commands, i.e., a status request command for checking the status of the printer engine, and an execution command for instructing the printer to perform some operation.

Each of the command information and status information has the eighth bit as a parity bit, and an odd parity is added upon transmission. The status information sent back by the engine controller has the first bit as a command error bit. That is, when a command supplied from the video controller is not predetermined data, or a parity error has occurred, the engine controller sets "1" in the first bit of status information, and sends back the status information.

FIG. 12 is an explanatory view showing an example of status information when no command error has occurred, i.e., the first bit is "0". FIG. 13 is an explanatory view showing status information when an error has occurred. When an error has occurred, "1" is set in the first bit, and the type of the error is specified by the second to seventh bits.

Basic status information when no error has occurred is sent back when the video controller sends "01" as a status request command, and six different types of status information except for the command error bit (first bit) and the parity bit (eighth bit) are included in this information.

More specifically, when "1" is set in the second bit, it indicates that the printer engine is ready to receive a signal PRNT. When "1" is set in the third bit, it indicates that the printer engine is transporting a recording paper sheet. When "1" is set in the fourth bit, it indicates that a recording paper sheet jam or a print error has occurred in the printer engine, and print data must be re-transmitted to the engine controller.

When "1" is set in the fifth bit, it indicates that the printer engine is waiting since the temperature of the heating roller in the fixing unit has not reached an appropriate temperature. When "1" is set in the sixth bit, it indicates that the printer engine is pausing due to a pause command from the video controller.

When "1" is set in the seventh bit, it indicates that the printer engine has failed and must be corrected by calling a service person or operator.

In addition, the engine controller has status signals for reporting, to the video controller, a recording paper sheet jam, the absence of paper sheets, the open state of the front door, a fixing failure, a motor failure and the like in response to the command from the video controller.

However, in such an apparatus, since the video controller supervises the conditions of the printer engine using serial communications, the following problem is posed.

That is, even when the condition of the printer engine remains the same, the video controller must perform serial communications to supervise a plurality of status bits, and the communication processing exerts a heavy load on the video controller.

SUMMARY OF THE INVENTION

It is, therefore, an object of the present invention to provide an image forming apparatus which can reduce the communication processing load on a video controller that supervises the conditions of a printer engine.

In order to achieve the above object, an image forming apparatus according to the present invention comprises image forming means for forming an image on a recording medium on the basis of pixel data generated by image processing means for generating pixel data, supervision means for supervising internal conditions of the image forming means, and communication means for transmitting information representing the supervised internal conditions to the image processing means, the image processing means comprising internal condition designation means for designating an internal condition, information of which is to be transmitted, and the communication means comprises report means for, when the designated internal condition has changed, reporting the change in designated condition to the image processing means.

The internal condition designation means preferably comprises supervision inhibition means for inhibiting supervision of a specific condition concerning the internal conditions.

The internal condition designation means preferably comprises specific condition designation means for designating a specific condition concerning the designated internal condition, and the report means reports when the internal condition changes to the designated specific condition.

According to the present invention, in a method wherein image forming means forms an image on a recording medium on the basis of pixel data generated by image processing means, internal conditions of the image forming means are supervised, and information representing the supervised internal conditions is transmitted to the image processing means. An internal condition, information of which is to be transmitted, is designated by the image processing means, and when the designated internal condition changes, the change in designated condition is reported to the image processing means.

According to the present invention, when the image processing means generates pixel data, the image forming means forms an image on a recording medium on the basis of the generated pixel data, the supervision means supervises the internal conditions of the image forming means, and the communication means transmits information representing the supervised internal conditions to the image processing means, the internal condition designation means can designate an internal condition, information of which is to be transmitted, and when the designated internal condition has changed, the report means reports the change in internal condition to the image processing means. For this reason, the image processing means can easily acquire information indicating the change in internal condition of the image forming means, and a communication processing load on the image processing means can be reduced.

According to the present invention, since the internal condition designation means comprises the supervision inhibition means for inhibiting supervision of a specific condition concerning the internal conditions, unnecessary specific conditions need not be supervised, and the communication processing load on the image processing means can be further reduced. In addition, the supervision processing load on the image forming means can be reduced.

According to the present invention, the internal condition designation means comprises the specific condition designation means for designating a specific condition concerning the designated internal condition, and the report means reports only when the internal condition changes to the designated specific condition. For this reason, a specific condition can be arbitrarily designated pertaining to the internal condition, and the communication processing load on the image processing means can be further reduced.

According to the present invention, the image processing means can easily acquire information representing a change in required internal condition of the image forming means, and the communication processing load on the image processing means can be reduced.

Other objects and advantages of the present invention will become apparent from the following detailed description taken in conjunction with the accompanying drawings and the appended claims.

BRIEF DESCRIPTION OF THE DRAWINGS

FIGS. 2A and 2B are explanatory views showing the internal arrangement of an engine unit 25;

FIG. 3 is an explanatory view showing a list of signals of a video interface 24;

FIG. 5 is an explanatory view showing the format of a condition change supervision designating command output from a controller unit 26;

FIG. 7 is an explanatory view showing the format of a condition supervising mask command in a serial communication of the video interface 24 in a printer according to the second embodiment of the present invention;

FIG. 9 is an explanatory view showing the format of a condition designating command in a serial communication of the video interface 24 in a printer according to the third embodiment of the present invention;

FIG. 11 is an explanatory view showing a list of signals of a video interface;

FIG. 12 is an explanatory view showing an example of status information when no command error has occurred, i.e., the first bit is "0";

FIG. 13 is an explanatory view showing status information when an error has occurred;

FIG. 16 is a view for explaining a condition change status designating command;

FIG. 18 comprised of FIGS. 18A and 18B is a flow chart showing the control operation of an engine controller 25a.

DETAILED DESCRIPTION OF THE PREFERRED EMBODIMENTS

The preferred embodiments of the present invention will be described in detail hereinafter with reference to the accompanying drawings. An image forming apparatus of this embodiment is applied to a printer.

First Embodiment

Figure 1:
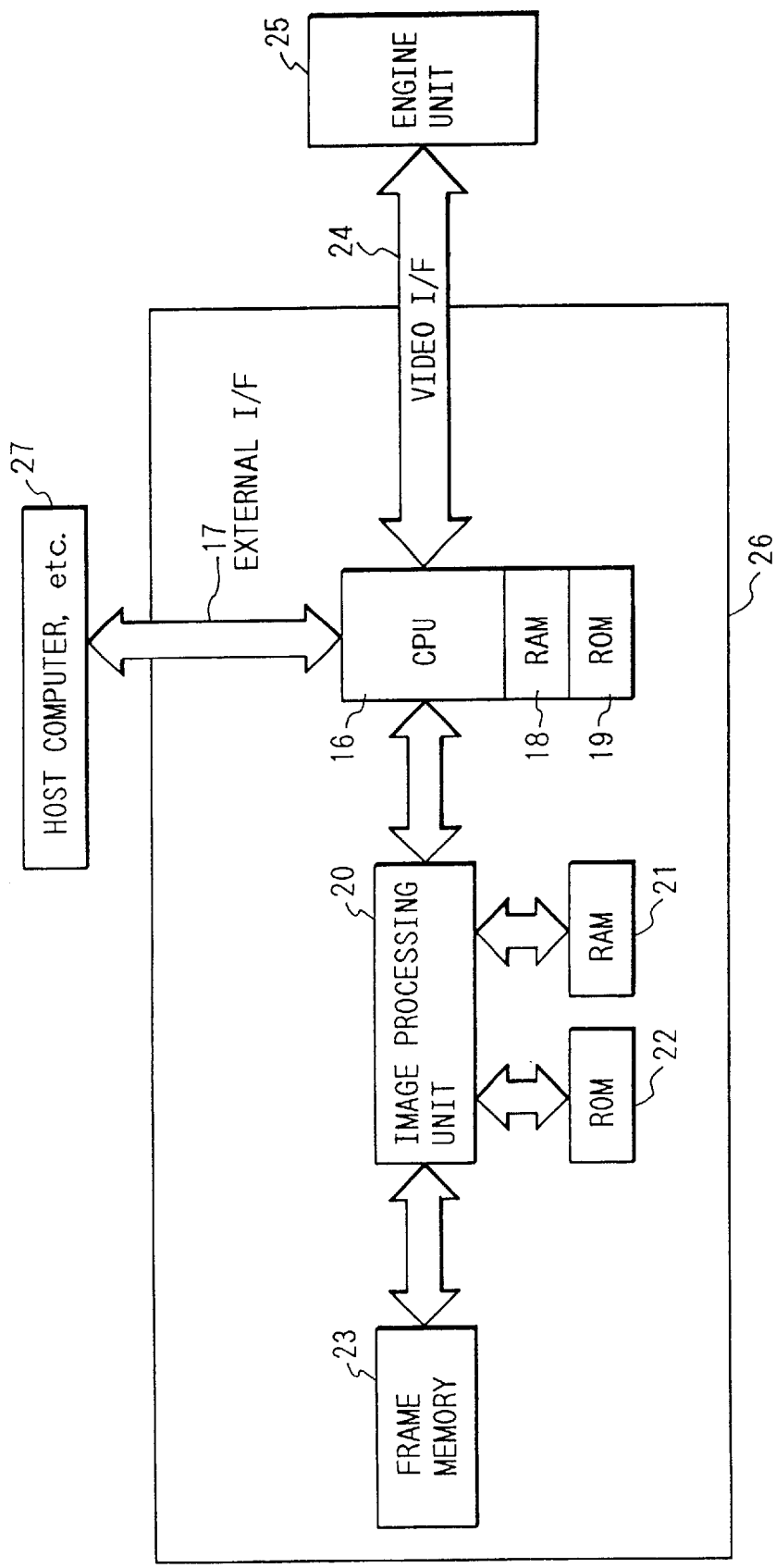
FIG. 1 is a block diagram showing the electrical arrangement of a printer according to the first embodiment of the present invention.

FIG. 1 is a block diagram showing the electrical arrangement of a printer according to the first embodiment of the present invention. Referring to FIG. 1, a controller unit (or printer controller) 26 includes components designated by reference numerals 16 to 24 (to be described below). A CPU 16 receives coded image information (code data) from an external apparatus 27 such as a host computer via an external interface 17 upon execution of a control program stored in a ROM 19. The received code data is input to an image processing unit 20. The image processing unit 20 stores the input code data in a RAM 21, and interprets the code data. The external apparatus 27 such as a host computer can perform various kinds of setting operations for the controller unit 26 via the external interface 17.

A RAM 18 is used as-registers, and the like. A ROM 22 stores font data corresponding to the values of code data. Font data corresponding to code data are read out from the ROM 22 to convert all received code data into video data consisting of dots, and the converted data are stored in a frame memory 23.

When video data for one page are stored in the frame memory 23, the CPU 16 outputs a print command to an engine unit 25 via a video interface 24, and outputs the video data stored in the frame memory 23 to the engine unit 25 in synchronism with main scanning and sub-scanning synchronization signals of the engine unit 25.

Figure 2A:
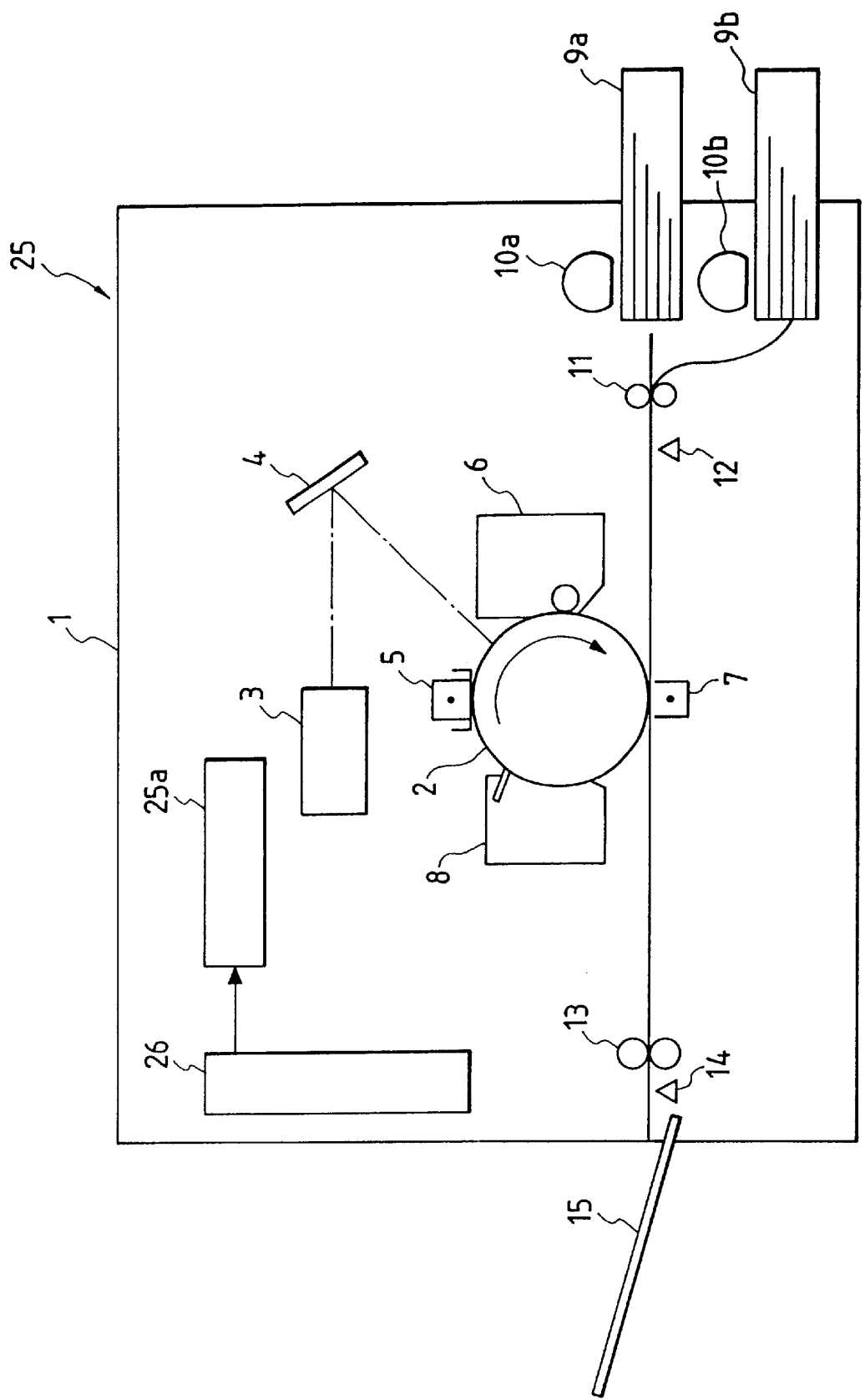

FIG. 2A is an explanatory view showing the internal arrangement of the engine unit 25. Referring to FIG. 2A, a printer main body 1 comprises a laser beam printer in this embodiment. A photosensitive drum 2 is used for visualizing video data. An optical unit 3 modulates a laser beam with video data sent via the video interface 24, and scans the modulated laser beam on the surface of the photosensitive drum 2 via a rotary polygonal mirror.

A return mirror 4 reflects a laser beam irradiated from the optical unit 3. A charger 5 uniformly charges the surface of the photosensitive drum 2. A developer 6 develops an electrostatic latent image on the surface of the photosensitive drum 2 to obtain a toner image. A transfer device 7 transfers the toner image on the surface of the photosensitive drum 2 onto a recording paper sheet. A cleaner 8 recovers the residual toner on the surface of the photosensitive drum 2 after the transfer operation.

An upper stage paper feed roller 10a is used for feeding paper sheets stored in an upper stage paper cassette 9a. A lower stage paper feed roller 10b is used for feeding paper sheets stored in a lower stage paper cassette 9b. Paper transporting rollers 11 are used for transporting a fed paper sheet to the transfer position. A paper feed sensor 12 is used for detecting the presence/absence of a fed paper sheet. A fixing device 13 fixes a toner image transferred onto the paper sheet by heating and compressing the toner image. An ejected paper tray 15 receives ejected paper sheets. An engine controller (or engine control unit) 25a controls the printer main body 1.

FIG. 2B shows the electrical arrangement of a control unit of the engine unit 25.

The engine control unit 25a exchanges signals with the printer controller 26, and controls the respective units in the printer engine via serial communications. A paper size detecting unit 103 detects the paper sizes in the respective cassettes, and supplies the detection information to the engine control unit. A detecting unit 104 of presence or absence of paper in a paper feed unit detects the presence/absence of a paper sheet at each of the respective paper feed ports of the cassettes, a manual insertion port, an option cassette, and an envelope feeder, and supplies the detection information to the engine control unit. A detecting unit 105 of presence or absence of an option confirms the connection states of the respective options such as an option cassette and an envelope feeder. A paper transporting control unit 106 performs paper transporting control. An optical system control unit 107 controls an optical system such as a scanner motor, a laser, and the like. A fixing device temperature control unit 108 performs temperature control, abnormality detection, and the like of the fixing device. An option control unit 109 issues operation instructions to the respective options such as an option cassette and an envelope feeder. A sensor input unit 110 detects the presence/absence of a paper sheet in each of transporting paths such as a registration path, eject path, double-side path, reversal path, and the like.

FIG. 3 is an explanatory view showing a list of signals of the video interface 24. A detailed description of the signals which have already been described in the paragraph of the related art will be omitted.

In this embodiment, status and command signals are transmitted via independent signal lines to attain smoother command/status exchange operations.

A signal line /STS is used for sending a status signal of serial information in units of 8 bits to be transmitted to the engine controller. A signal /PCLK is a synchronization clock upon serial transmission of the signal /STS.

A signal /CMD is a command signal, which is transmitted as serial information in units of 8 bits from the video controller to the engine controller. A signal /CCLK is a synchronization clock of serial data upon transmission of the signal /CMD.

Furthermore, in this embodiment, a designated condition change signal (a signal /CCHG) is added. Upon reception of a condition change supervision designating command (to be described later) from the controller unit 26, the engine unit 25 supervises the designated internal condition, and sets the signal /CCHG to be true for 10 msec immediately after the supervised internal condition has changed.

Figures 4, 6:
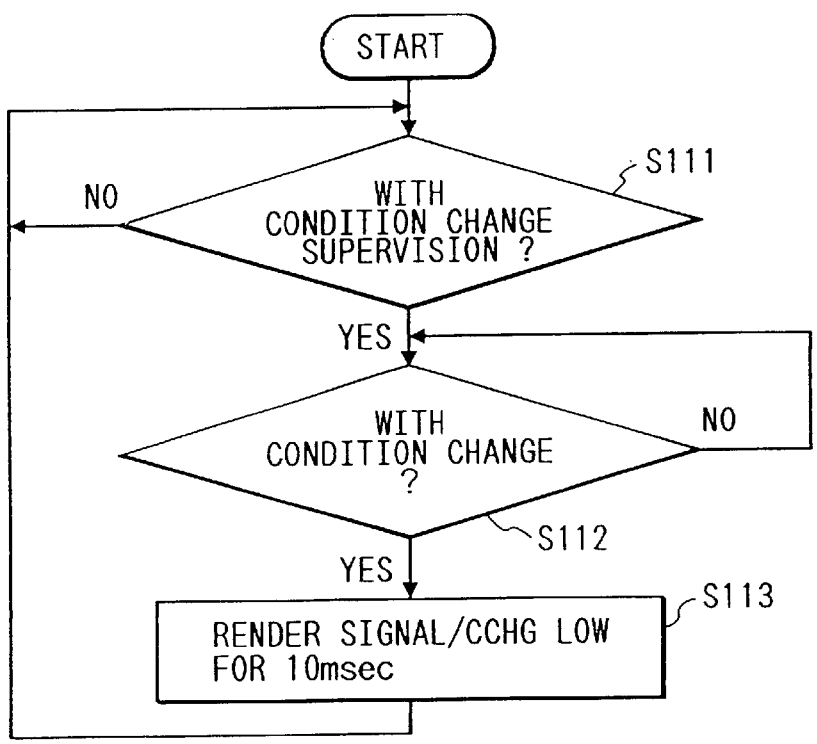
FIG. 4 is an explanatory view showing a list of conditions (status) of the engine unit 25.
FIG. 6 is a flow chart showing the control processing for supervising conditions upon reception of a condition change supervision command by a CPU of the engine unit 25.

FIG. 4 is an explanatory view showing a list of conditions (status) of the engine unit 25. A basic status indicated by status number 0 indicates a condition required for starting the print operation of the engine unit 25. A detailed description of the respective bits will be omitted since they have already been described in the paragraphs of the related art.

As for the status contents of status numbers 1 to 6, a detailed description of their bit formats will be omitted. An operator call status indicates that an error that can be recovered by a user has occurred, a service call status indicates that a failure that requires repair has occurred, a misprint status indicates a case of an image error that has occurred during a print operation, a retransmission page status indicates the number of error pages of the misprint, an upper stage paper size status indicates the size of paper sheets stored in the upper stage paper cassette 9a, and a lower stage paper size status indicates the size of paper sheets stored in the lower stage paper cassette 9b.

FIG. 5 is an explanatory view showing the format of the condition change supervision designating command to be output from the controller unit 26. The command is expressed by two bytes. The first byte is fixed to be 7F(HEX). Upon reception of the first byte, the engine unit 25 recognizes the condition change supervision designating command, and waits for the second byte. The second byte designates a status number by a 6-bit binary value except for a command error bit (MSB) and a parity bit (LSB). For example, when the lower stage paper size (status number 6) status is to be designated, the binary value is set to be 0D(HEX).

The engine unit 25 supervises the value of the status designated by the condition change supervision designating command, and when the value of the status to be supervised changes, the unit 25 sets the signal /CCHG to be true (L level) for 10 msec. For example, when the upper stage paper size (status number 5) status is designated (command 7F(HEX)+0B(HEX)), every time the paper size of the upper stage paper cassette changes, the signal /CCHG changes to L level for 10 msec.

FIG. 6 is a flow chart showing the control processing for supervising the condition upon reception of a condition change supervision command by the CPU of the engine unit 25. Referring to FIG. 6, it is checked if a condition change supervision command is received from the controller unit 26 (step S111). If YES in step S111, the status condition designated by the status change supervision command is supervised (step S112). If the contents of the status change, the signal /CCHG is set at L level for 10 msec (step S113).

As described above, the controller unit 26 designates a status, whose condition change is to be detected, of those of the engine unit 25, and the engine unit 25 reports the change in designated status contents to the controller unit 26 via the video interface 24. Thus, the controller unit 26 can detect the condition change. For this reason, the controller unit 26 need not always read out status data using serial communications via the video interface 24, thus simplifying the communication processing required for reading out status data.

In this embodiment, the signal /CCHG is output as pulses. However, the present invention is not limited to this. For example, a signal /CCHG cancel command may be provided, a state wherein the engine unit 25 detects the change and sets the signal /CCHG to be true is held, and the signal /CCHG may be restored to an original state upon reception of the signal /CCHG cancel command from the controller unit 26.

Second Embodiment

A printer according to the second embodiment will be described below. Since the arrangement and operation of the printer of this embodiment are substantially the same as those of the first embodiment, except for a function added to the second embodiment, a detailed description of the same portions as in the first embodiment will be omitted. FIG. 7 is an explanatory view showing the format of a condition supervising mask command for a serial communication of the video interface 24 in the printer of the second embodiment.

The condition supervising mask command is expressed by two bytes, and is used in combination with the condition change supervision designating command described in the first embodiment. The first byte of the condition supervising mask command is fixed to be 3E(HEX). The engine unit 25 recognizes the condition supervising mask command upon reception of the first byte, and waits for the second byte. The second byte designates a mask position using six bits except for a command error bit (MSB) and a parity bit (LSB).

When the mask position designating bit corresponding to one status bit in the condition change supervision designating command is "1", masking processing for inhibiting supervision of the change in status is performed. On the other hand, when the bit is "0", supervision is continued.

For example, in order to designate the basic status (status number 0) by the condition change supervision command (command 7F(HEX)+01(HEX)) and to supervise the change in condition of only the print request (second bit) by the condition supervising mask command, the command including the first byte=3E(HEX) and the second byte=3E(HEX) is output. When the print request bit changes, the signal /CCHG changes to L level for 10 msec. On the other hand, when other bits of the basic status change, the signal /CCHG remains at H level.

Figure 8:
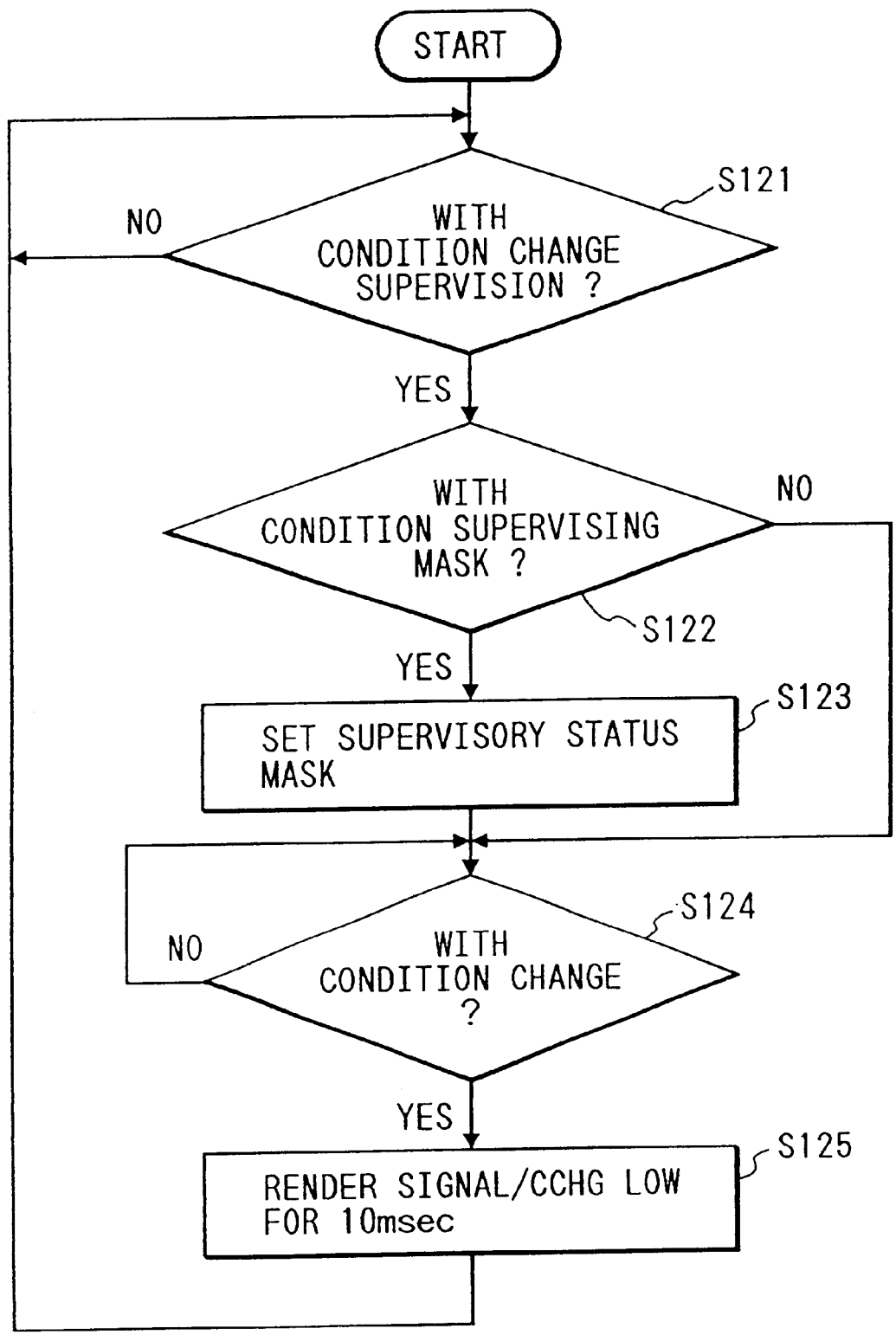
FIG. 8 is a flow chart showing the control processing for supervising conditions upon reception of the condition supervising mask command by a CPU of the engine unit 25.

FIG. 8 is a flow chart showing the control processing for supervising a condition upon reception of the condition supervising mask command by the CPU of the engine unit 25. It is checked if a condition change supervision command is received from the controller unit 26 (step S121). If YES in step S121, it is then checked if a condition supervising mask command is received from the controller unit 26 (step S122). If YES in step S122, the contents of the first and eighth bits of the second byte data (see FIG. 7) of the condition supervising mask command are replaced by a value "1", and the replaced data is stored as mask data in the RAM (step S123).

On the other hand, if it is determined in step S122 that no condition supervising mask command is received, data obtained by ORing the status condition designated by the condition change supervision command and the mask data is supervised, and when the contents of the data change, the signal /CCHG is set at L level for 10 msec.

Default mask data is set to be 81(HEX) so as not to mask status data.

As described above, since status data used for supervising the condition change can be masked in units of bits, supervision can be attained in units of status bits.

Third Embodiment

A printer according to the third embodiment of the present invention will be described below. Since the arrangement and operation of the printer of this embodiment are substantially the same as those of the first embodiment, except for a function added to the second embodiment, a detailed description of the same portions as in the first embodiment will be omitted. FIG. 9 is an explanatory view showing the format of a condition designating command of a serial communication of the video interface 24 in the printer of the third embodiment.

The condition designating command is expressed by two bytes, and is used in combination with the condition change supervision designating command described in the first embodiment. The first byte of the condition designating command is fixed to be 5E(HEX). The engine unit 25 recognizes the condition designating command upon reception of the first byte, and waits for the second byte. The second byte designates a status value using six bits except for a command error bit (MSB) and a parity bit (LSB), and the six bits represent a specific value with respect to the status designated by the condition change supervision designating command.

For example, when the lower stage paper size status (status number 6) is designated by the condition change supervision command (command 7F(HEX)+0D(HEX)), and the condition designating command designates the legal paper size, the command including the first byte=5E(HEX) and the second byte=1C(HEX) is output. With this command, when legal paper sheets are set in the lower stage paper cassette, the lower paper size status changes to 1C(HEX), and the engine unit 25 can detect this change, thus setting the signal /CCHG at L level for 10 msec.

When paper sheets other than legal paper sheets are set in the lower stage paper cassette, the lower stage paper size status assumes a value other than 1C(HEX) (for example, 01(HEX) for A4 paper sheets), and the signal /CCHG remains at H level.

Figure 10:
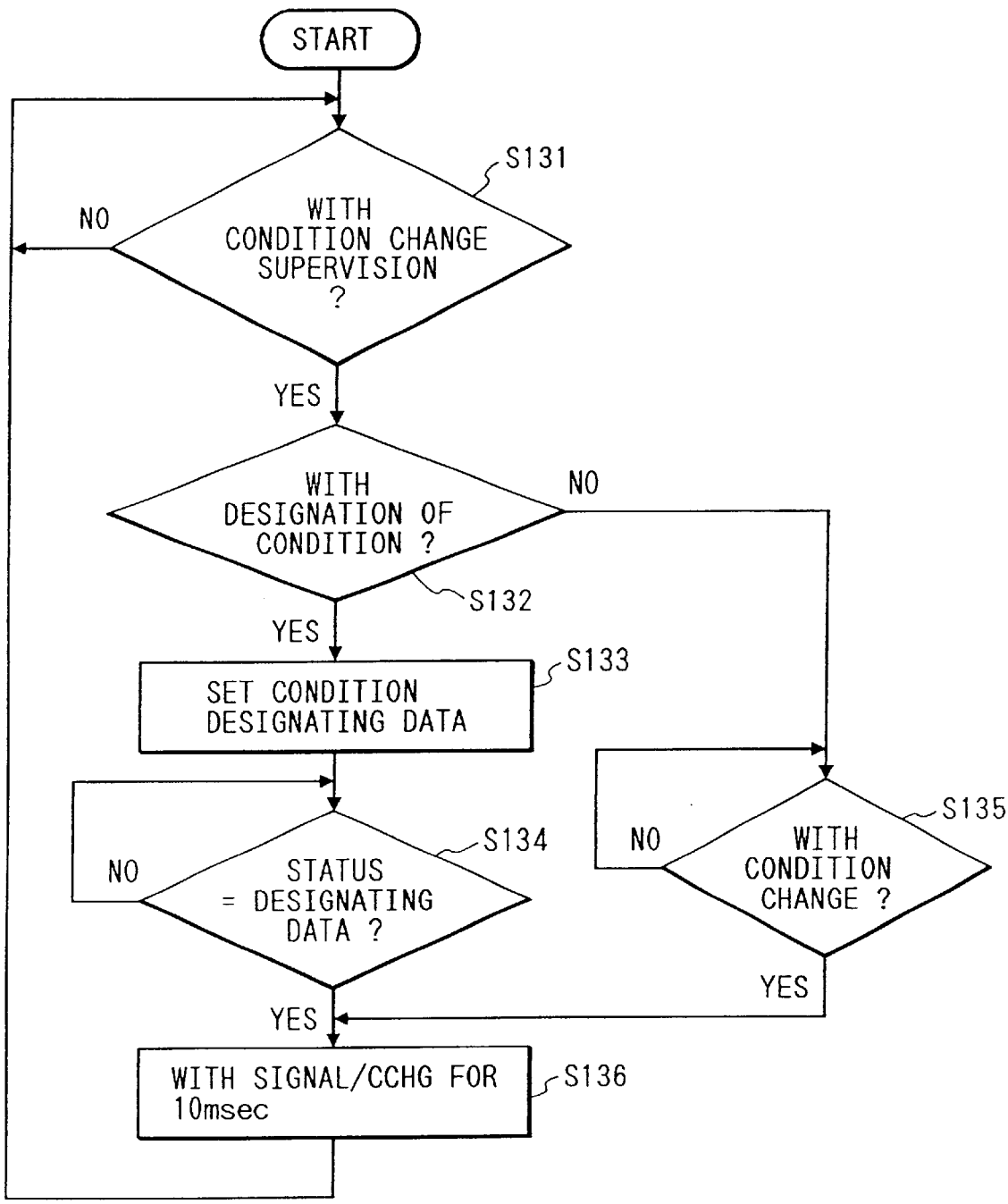
FIG. 10 is a flow chart showing the control processing for supervising conditions upon reception of the condition designating command by a CPU of the engine unit 25.

FIG. 10 is a flow chart showing the control processing for supervising a condition upon reception of the condition designating command by the CPU of the engine unit 25. It is checked if a condition change supervision command is received from the controller unit 26 (step S131). If YES in step S131, it is then checked if a condition designating command is received from the controller unit 26 (step S132). If YES in step S132, the second byte data (see FIG. 9) of the condition designating command is stored in a RAM (not shown) as designating data (step S133).

It is checked if the status designated by the condition change supervision command is equal to the designating data (step S134). If YES in step S134, the signal /CCHG is set at L level for 10 msec (step S136).

On the other hand, if it is determined in step S132 that a condition designating command is not received, the condition of the status designated by the condition change supervision command is supervised (step S135), and if the status contents change, the flow advances to step S136.

As described above, only when an arbitrary status changes to a specific condition, the change is reported by a signal to the controller unit 26. Therefore, the communication processing load on the controller unit 26 can be further reduced.

In the above embodiments, the present invention is applied to a printer as the image forming apparatus, but may be applied to a copying machine.

Fourth Embodiment

The fourth embodiment of the present invention will be described below. Since the arrangement of the fourth embodiment is the same as that shown in FIGS. 1 to 3, a detailed description thereof will be omitted, and only a difference will be explained below.

Figures 14, 14A:
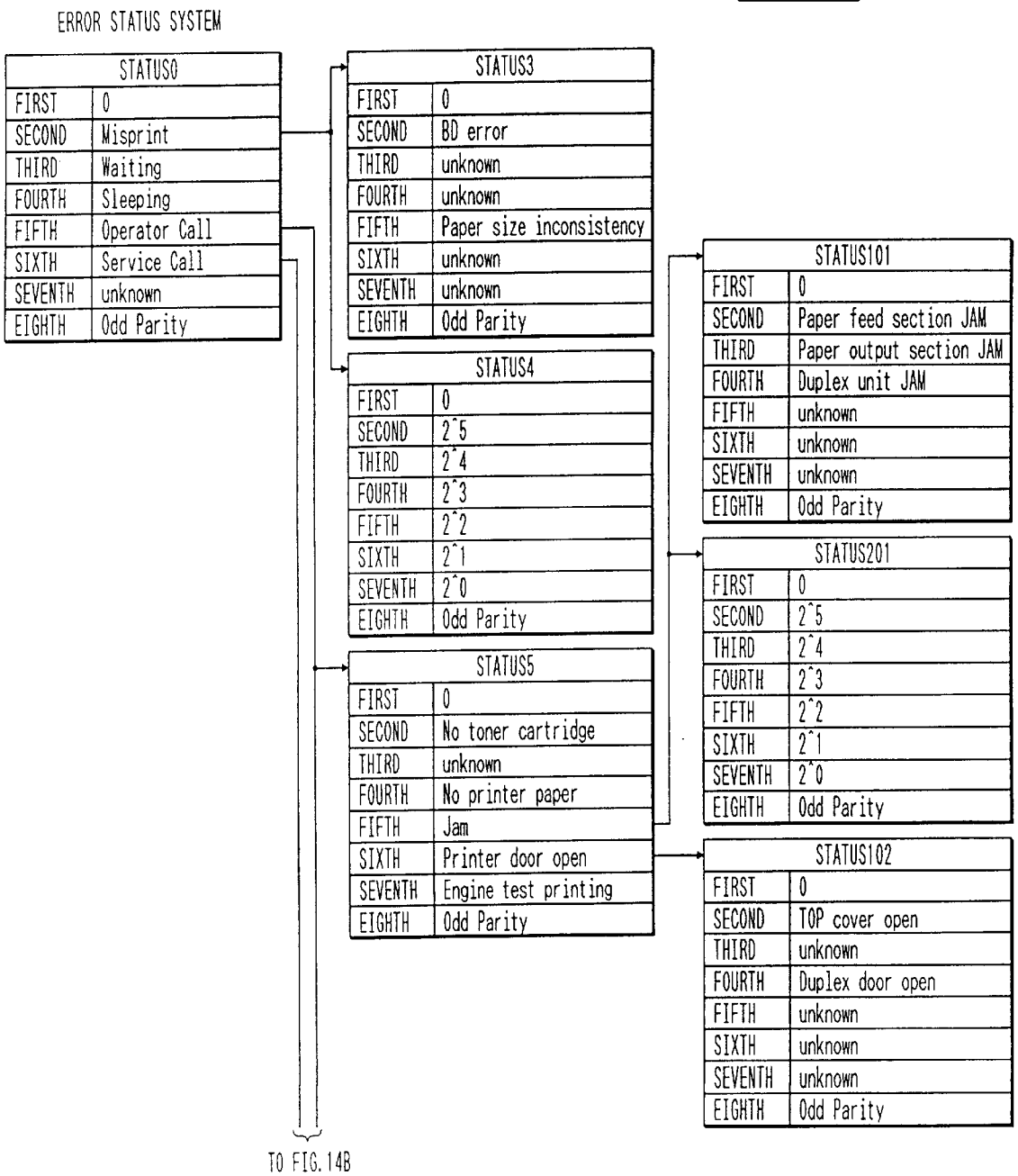
FIG. 14 comprised of FIGS. 14A and 14B is a view for explaining an error status system.
Figure 14B:
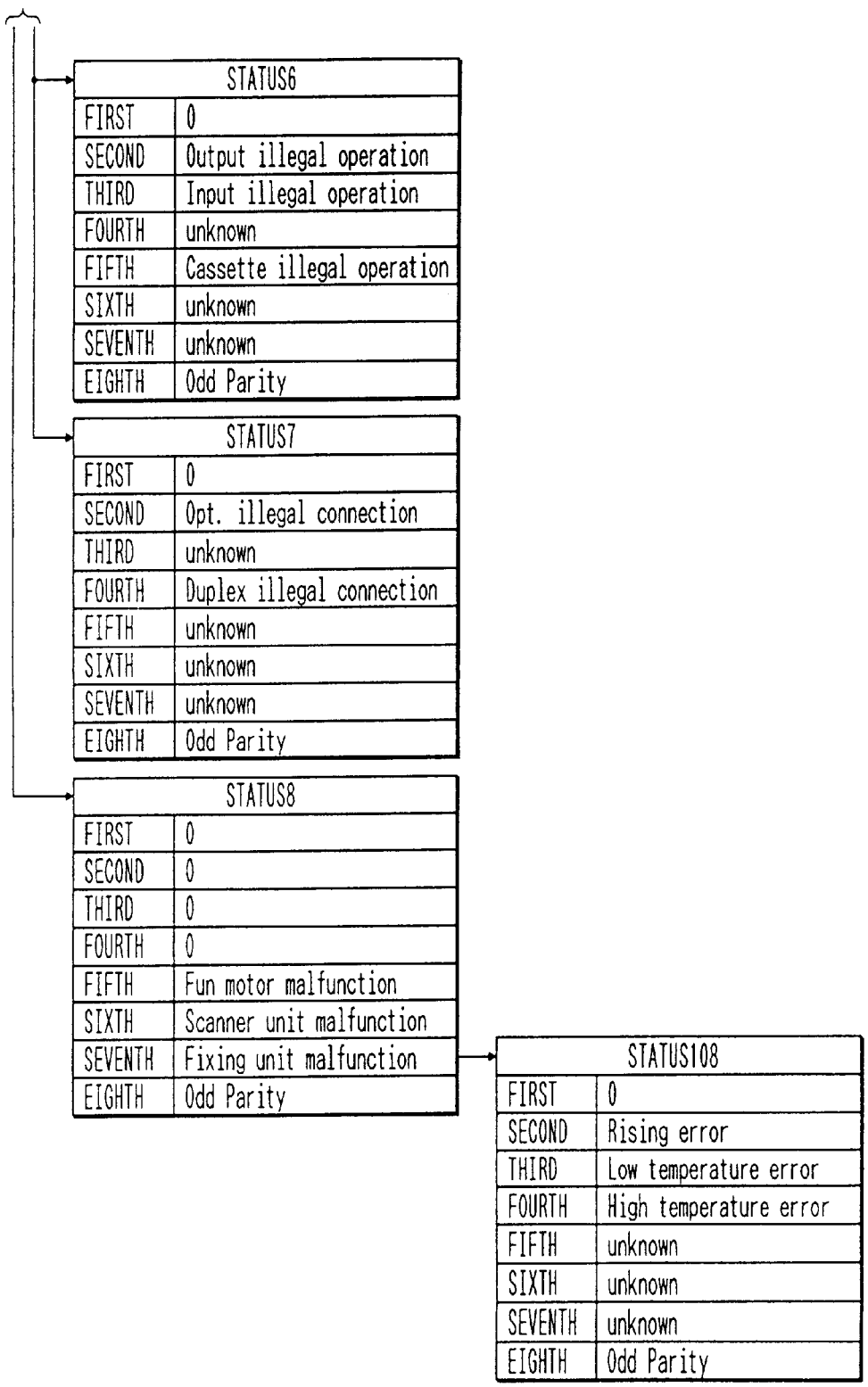
Figure 15B:
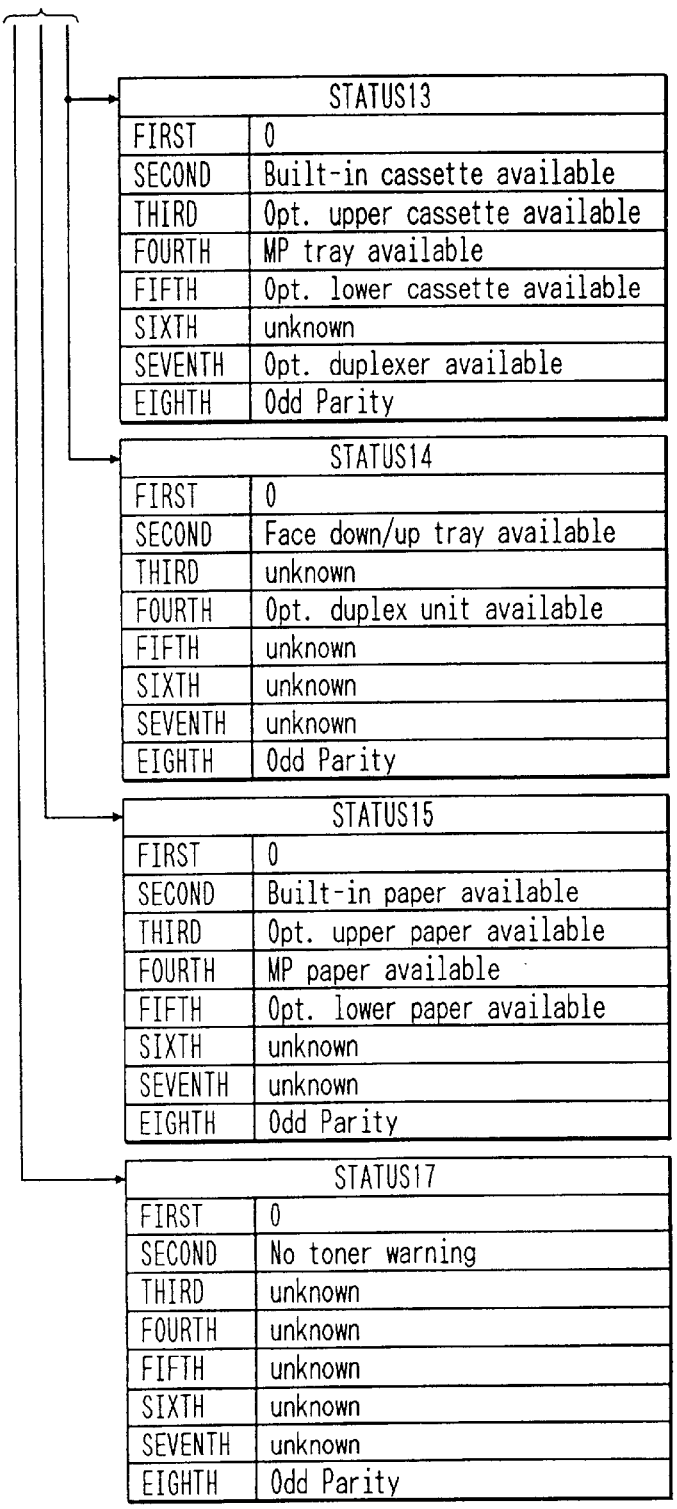
FIG. 15 comprised of FIGS. 15A and 15B is a view for explaining a condition change status system.

In this embodiment, status data are classified into two systems. FIGS. 14A and 14B show the error status system, and status data of status numbers 0, 3 to 8, 101, 102, 108, and 201 are classified in this system. FIGS. 15A and 15B show the condition change status system, and status data of status numbers 1, 10 to 15, and 17 are classified in this system.

The error status system will be explained below placing emphasis on status of status number 0.

The second bit of STATUS0 changes to "1" when any one of bits of STATUS3 is "1" or when STATUS4 assumes a value other than "0" and a print error that requires retransmission of print data has occurred. When the second bit of STATUS0 is "1", the number of retransmission pages is confirmed based on STATUS4 (retransmission page status) after the second bit (indicating that the paper sheet is being transported) of STATUS2 changes to "0". In order to set the second bit to be "0", the controller unit 26 must output a misprint cancel command.

The third bit of STATUS0 is set to be. "1" during the period from when the power switch is turned on or the front door is closed until the printer is ready to print. The fourth bit of STATUS0 changes to "1" when the printer is set in the sleep mode in response to a sleep mode instruction command. In order to set the fourth bit of STATUS0 to be "0", the sleep state must be canceled by a sleep mode cancel command.

The fifth bit of STATUS0 changes to "1" when any one of bits of STATUS5, STATUS6, and STATUS7 is "1". The sixth bit of STATUS0 changes to "1" when any one of bits of STATUS8 is "1".

The condition change status system will be explained below focusing on STATUS1.

The second bit of STATUS1 changes to "1" when one of the paper sizes (STATUS10, STATUS11, and STATUS12) changes. This bit changes to "0" upon reception of a status request of the changed status.

The third bit of STATUS1 changes to "1" when a paper feed/eject unit construction status (one of STATUS13 and STATUS14) changes. This bit changes to "0" upon reception of a status request of the changed status.

The fourth bit of STATUS1 changes to "1" when a status (STATUS15) indicating the presence or absence of paper in the paper feed unit changes. This bit changes to "0" upon reception of a status request of the changed status.

The fifth bit of STATUS1 changes to "1" when a warning status (STATUS17) changes. This bit changes to "0" upon reception of a status request of the changed status.

In this embodiment, an item whose condition change is to be supervised can be designated by the signal /CCHG as in the first embodiment. FIG. 16 shows an example of the designating command. This command consists of two bytes, and designates an item to be supervised in accordance with the value (FIG. 16) of the second byte following the first byte "AB" (HEX).

The second to fifth bits shown in FIG. 16 respectively correspond to the second to fifth bits of STATUS1. When these bits are "1", the corresponding bits of STATUS1 can be associated with the signal /CCHG. More specifically, the signal /CCHG is a signal for reporting to the printer controller 26 that the designated internal status of the printer has changed, and is output from the printer engine 25 to the printer controller 26.

The signal /CCHG changes to "true" when one of bits of status data associated with bits constituting STATUS1 (condition change status) designated by the above-mentioned command changes to "1".

The printer controller 26 issues a STATUS1 request command after the signal /CCHG has changed to "true" upon a change in STATUS1, thereby setting the signal /CCHG to be "false". The signal /CCHG maintains "true" until the leading edge of the signal /SBSY upon issuance of a return status in response to the STATUS1 request command issued by the printer controller 26.

During the "true" period of the signal /CCHG and before the STATUS1 request command is issued, when another change takes place in the printer, the corresponding information is reflected in STATUS1.

Note that the designation state of the command is held as a status (e.g., STATUS23), and is returned upon designation or upon reception of a STATUS23 request command from the printer controller 26. All the second to fifth bits of STATUS23 are set to be "1" during the period in which no designation is received from the printer controller 26 by means of EEC21 after the power switch is turned on or after software reset processing is performed in response to a signal /CPRDY.

Figure 17:
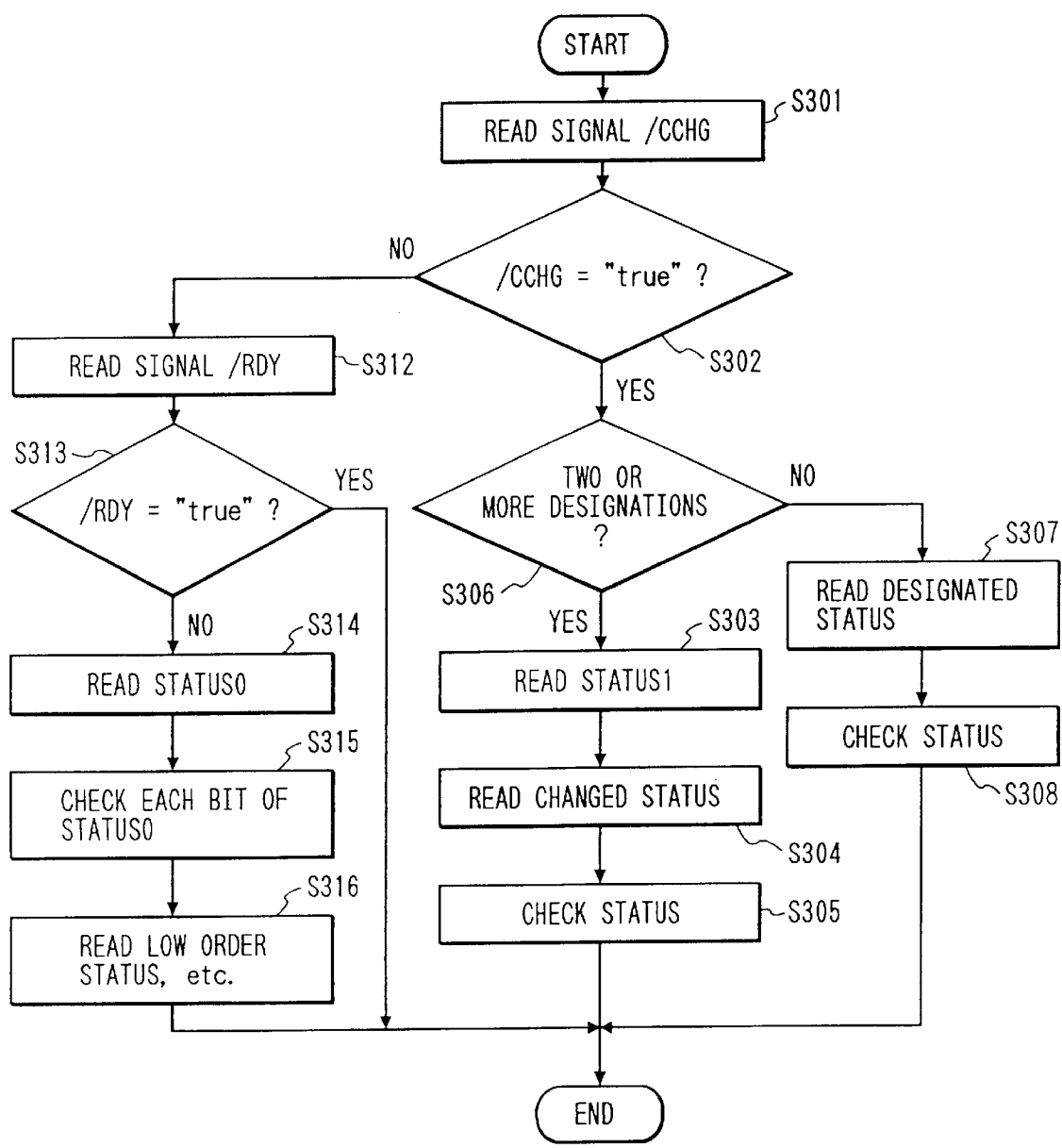
FIG. 17 is a flow chart showing the control operation of the controller unit 26.

FIG. 17 is a flow chart showing the status search processing of the printer controller 26 side.

The controller 26 normally checks the signals /RDY and /CCHG (S301, S302, S312, S313), and reads status information when these signals change. In this case, when the signal /CCHG is "false" and the signal /RDY changes to "false", the controller 26 checks STATUS0 (S314). In accordance with the checking result in step S314, a low-order status corresponding to the respective bits is looked up to recognize its details (S315, S316).

On the other hand, if the signal /CCHG changes to "true", and if two or more different status types are designated (S306), STATUS1 is read first (S302) to recognize the changed status types, and the statuses of the group to which the recognized status types belong are read to recognize their details (S304, S305). If one status type is designated, the status is read (S307) and is checked (S308). In this case, even when the two or more different status types are designated, the designated status types may be sequentially read to recognize their details.

A sequence for resetting the signal /CCHG indicating the condition change will be described below.

Figure 18B:
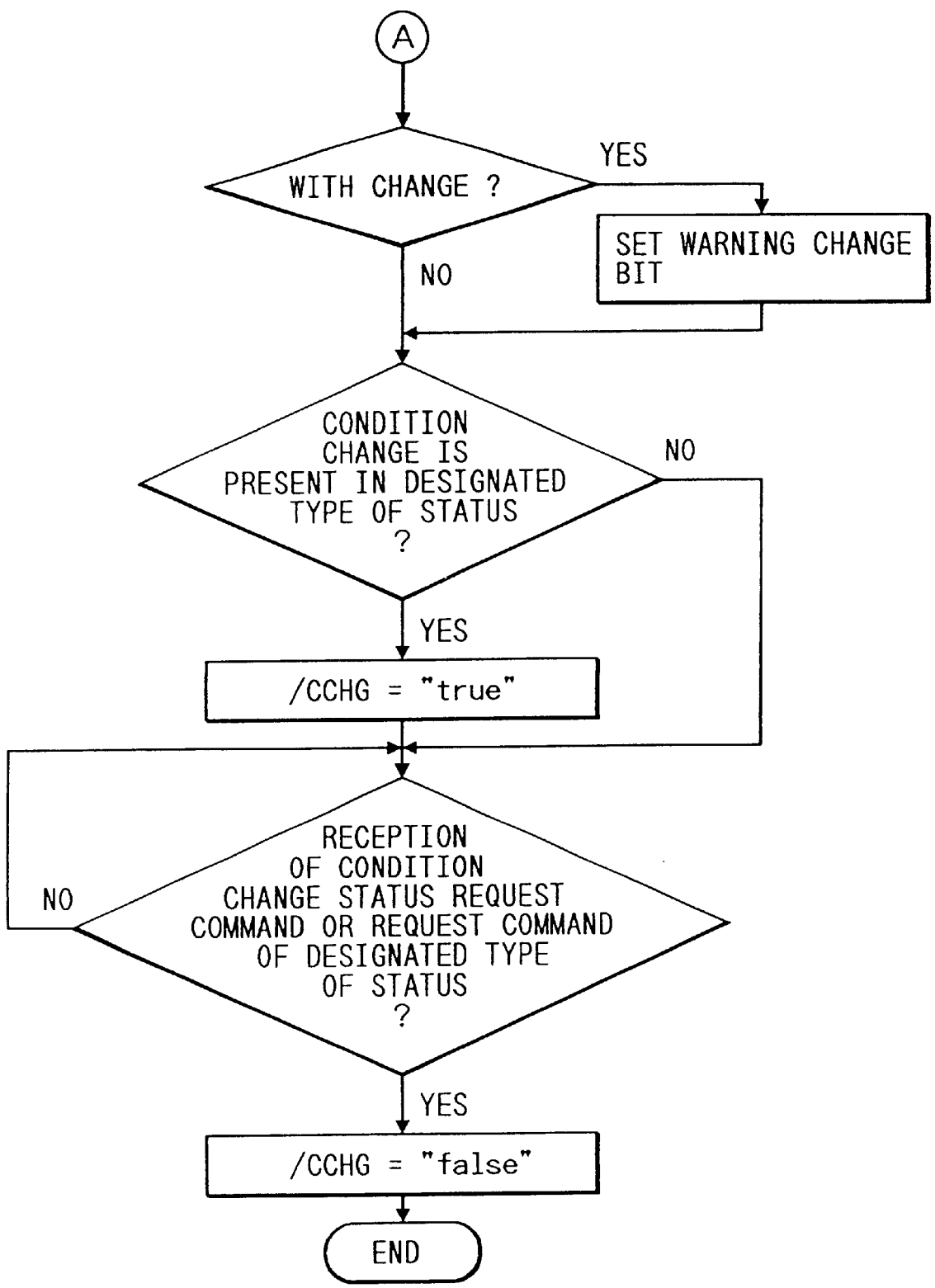

FIGS. 18A and 18B are flow charts showing the status generation sequence with respect to a condition change in the engine unit by the engine control unit 25a.

More specifically, the engine control unit 25a always checks changes in status of terminals, i.e., a change in paper size, a change in presence/absence of paper sheets, a change in paper feed unit function, and a change in warning condition. When a change is detected, the unit 25a sets the condition change status (the corresponding bit of STATUS1) as an upper-order status, and sets the signal /CCHG as a hardware signal to be "true". Thereafter, when the engine control unit 25a receives a status request command from the printer controller 26, and determines that the condition change status is read by the printer controller 26, it sets the signal /CCHG to be "false". Note that the engine control unit 25a determines that the condition change status is read at either of the following timings:

(1) when the unit 25a receives a condition change status request command; and (2) when the unit 25a outputs the condition change status in response to the condition change status request command. The respective bits of the condition change status STATUS1 are cleared after the status is output.

In the case of (1), when the condition has changed, and when the signal /CCHG has changed to "true" in the sequence shown in FIGS. 18A and 18B, the printer controller 26 detects the signal /CCHG and issues a command for requesting the condition change status STATUS1 (or status of the designated type (item)). The engine control unit 25a receives a signal /CMD from the printer controller 26, and outputs the condition change status STATUS1 or the status of the designated type as a signal /STS when it determines that the received command is a condition change status request command or a request command of the status of the designated type. Immediately thereafter, the unit 25a clears the respective bits of STATUS1 and the signal /CCHG.

In the case of (2), the engine control unit 25a receives a request command of the condition change status (or the status of the designated type), and outputs the condition change status STATUS1 (or the status of the designated type) in response to the command. When the unit 25a confirms that the status is output to the printer controller 26, it clears the respective bits of STATUS1 and the signal /CCHG.

As described above, since the status system using a condition or signal indicating a change in condition is used, in place of recognizing a change in status which is not associated with the signal /RDY by periodically sampling status information, the printer controller recognizes occurrence of a change on the basis of the hardware signal (the signal /CCHG), then reads the group to which the status that has changed belongs from one status, and can search for a low-order status indicating details on the basis of the read information.

With this control, the printer controller need not periodically check status information, and image development processing as an important function of the printer controller can be efficiently realized, thus greatly contributing to an improvement of printer performance.

In this embodiment, the electrophotography-type printer has been exemplified. However, the present invention is not limited to this, and may be applied to various other printers such as an ink-jet printer, a thermal printer, and the like.

In this embodiment, the method based on the signal /TOP (printer engine→controller) has been exemplified. However, the present invention may be similarly applied to a vertical synchronization method based on signals /VSREQ and /VSYNC.

On the other hand, the signal /CCHG may be reset in accordance with a specific command for instructing the reset operation. In this case, the engine control unit 25a clears the condition change status and the signal /CCHG upon reception of a reset command of condition change information from the printer controller 26. The condition change is checked in the same manner as in FIGS. 18A and 18B. In this case, however, the condition change status STATUS1 and the signal /CCHG are reset upon reception of a specific command, i.e., a condition change clear command.

When the condition change status and the signal /CCHG are reset, the printer controller 26 can clear condition change information (the signal /CCHG and the respective bits of the condition change status) by selecting an appropriate timing. On the other hand, the signal /CCHG may be reset after the basic status is transmitted.

As a method of reporting the condition change from the engine control unit 25a to the printer controller 26, the engine control unit 25a may output the signal /CCHG as a pulse signal having a predetermined pulse width, as has been described above in the first embodiment. The signal /CCHG is cleared at the timing selected by the engine control unit 25a independently of the status request command or the clear command from the printer controller 26. In this case, the respective bits of the condition change status may be reset after the status is output in response to the condition change status or may be cleared after the condition change clear command is received.

Note that the present invention may be applied to either a system constituted by a plurality of devices or an apparatus consisting of a single device. Also, the present invention may be applied to a case wherein the invention is attained by supplying a program to the system or apparatus.

The present invention is not limited to the above embodiments, and various modifications may be made within the scope of the claims.

What is claimed is:

1. An operational apparatus comprising:

operational means of which conditions of a plurality of types are changeable;

supervision means for supervising internal conditions of said operational means;

means for transmitting information representing the supervised internal conditions to condition monitoring means;

means for receiving designating information which is supplied from the condition monitoring means and designates a type of internal condition to be transmitted; and report means for, when the internal condition of the designated type changes, reporting the change in the internal condition to the condition monitoring means, wherein said report means comprises output means for outputting a level signal corresponding to a presence or absence of a change in internal condition of the designated type, and said output means resets the level signal in response to a request of the information representing the supervised internal condition of the designated type from the condition monitoring means.

2. An apparatus according to claim 1, further comprising inhibition means for inhibiting reporting in response to a specific condition concerning the internal condition of the designated type.

3. An apparatus according to claim 1, further comprising:

specific condition designating means for designating a specific condition concerning the internal condition of the designated type, wherein said report means reports when the internal condition changes to the designated specific condition.

4. An apparatus according to claim 1, further comprising:

means for supplying information representing whether each internal condition of a plurality of types has been changed or not, to the condition monitoring means, wherein said output means resets the level signal in response to a request of the information from the condition monitoring means.

5. A method of receiving a condition change from an operational apparatus, said method comprising the steps of:

outputting designating data for designating a type of condition, a presence or absence of a condition change of which is to be reported from the operational apparatus;

receiving a change signal indicating the presence or absence of the condition change of the type designated by the designating data; and requesting data representing a cause of a change in a ready signal indicating whether or not the operational apparatus is ready when the ready signal changes to false.

6. A method according to claim 5, further comprising the step of requesting the operational apparatus to output data associated with the condition in response to reception of the change signal.

7. A method according to claim 6, wherein the data associated with the condition is data representing the type of condition that has changed.

8. A method according to claim 6, wherein the data associated with the condition is data representing the condition of the designated type.

9. An operational method comprising the steps of:

supervising a plurality of types of changeable internal conditions of operational apparatus:

transmitting information representing the supervised internal conditions to condition monitoring means;

receiving designating information which is supplied from the condition monitoring means and designates a type of internal condition to be transmitted;

reporting, when the internal condition of the designated type changes, the change in the internal condition to the condition monitoring means;

outputting a level signal corresponding to a presence or absence of a change in internal condition of the designated type; and resetting the level signal in response to a request of the information representing the supervised internal condition of the designated type from the condition monitoring means.

10. A method according to claim 9, further comprising a step of inhibiting reporting in response to a specific condition concerning the internal condition of the designated type.

11. A method according to claim 9, further comprising the step of:

designating a specific condition concerning the internal condition of the designated type, wherein, in said reporting step, reporting is performed when the internal condition changes to the designated specific condition.

12. A method according to claim 9, further comprising the step of:

supplying information representing whether each internal condition of a plurality of types has been changed or not, to the condition monitoring means.

13. A receiving apparatus for receiving a condition change from an operational apparatus, said receiving apparatus comprising:

outputting means for outputting designating data for designating a type of condition, a presence or absence of a condition change of which is to be reported from the operational apparatus;

receiving means for receiving a change signal indicating the presence or absence of the condition change of the type designated by the designating data; and requesting means for requesting data representing a cause of a change in a ready signal indicating whether or not the operational apparatus is ready when the ready signal changes to false.

14. An apparatus according to claim 13, further comprising second requesting means for requesting the operational apparatus to output data associated with the condition in response to reception of the change signal.

15. An apparatus according to claim 14, wherein the data associated with the condition is data representing the type of condition that has changed.

16. An apparatus according to claim 14, wherein the data associated with the condition is data representing the condition of the designated type.

* * * * *

UNITED STATES PATENT AND TRADEMARK OFFICE
CERTIFICATE OF CORRECTION

PATENT NO. : 6,462,831 B1
DATED : October 8, 2002
INVENTOR(S) : Satoshi Akiyama

It is certified that error appears in the above-identified patent and that said Letters Patent is hereby corrected as shown below:

Column 5,
Line 47, "as-registers," should read -- as registers, --.

Column 11,
Line 50, "25$a$always" should read -- 25$a$ always --.

Signed and Sealed this

Sixth Day of May, 2003

JAMES E. ROGAN
*Director of the United States Patent and Trademark Office*